(12) United States Patent
Oofune

(10) Patent No.: US 6,530,998 B1
(45) Date of Patent: Mar. 11, 2003

(54) FORMED ARTICLE OF AMORPHOUS ALLOY HAVING HARDENED SURFACE AND METHOD FOR PRODUCTION THEREOF

(75) Inventor: Hitoshi Oofune, Sendai (JP)

(73) Assignee: YKK Corporation, Tokyo (JP)

(*) Notice: Subject to any disclaimer, the term of this patent is extended or adjusted under 35 U.S.C. 154(b) by 57 days.

(21) Appl. No.: 09/702,746

(22) Filed: Nov. 1, 2000

(30) Foreign Application Priority Data

Nov. 18, 1999 (JP) .......................... 11-327874

(51) Int. Cl.⁷ .................. C23C 8/10; C23C 8/24
(52) U.S. Cl. .............. 148/238; 148/666; 148/672; 148/688
(58) Field of Search .................. 148/238, 317, 148/403, 421, 420, 437, 672, 666, 688; 428/469, 472

(56) References Cited

U.S. PATENT DOCUMENTS

| | | | |
|---|---|---|---|
| 4,504,327 A | 3/1985 | Inomata et al. | |
| 4,944,663 A | * 7/1990 | Iizuka et al. ............ | 418/178 |
| 6,158,900 A | 12/2000 | Omiya et al. | |

FOREIGN PATENT DOCUMENTS

| | | |
|---|---|---|
| EP | 0 406 770 A1 | 1/1991 |
| EP | 0 470 599 A1 | 2/1992 |
| EP | 0 851 253 A2 | 7/1998 |
| EP | 0878723 A2 | 11/1998 |
| JP | 59-45621 | 3/1984 |
| JP | 61-250162 | 11/1986 |
| JP | 2-111866 | 4/1990 |
| JP | 6-346219 | 12/1994 |
| JP | 11104281 A | 4/1999 |
| JP | 11-189855 | 7/1999 |
| JP | 11-300450 | 11/1999 |
| JP | 11-302823 | 11/1999 |
| WO | WO 93/06257 | 4/1993 |

OTHER PUBLICATIONS

European Search Report dated May 15, 2001, from corresponding Application No. EP00 12 4243.

* cited by examiner

Primary Examiner—Roy King
Assistant Examiner—Harry D. Wilkins, III
(74) Attorney, Agent, or Firm—Finnegan, Henderson, Farabow, Garrett, & Dunner, L.L.P.

(57) ABSTRACT

A ceramic hard layer is formed on the surface of a formed article by subjecting the formed article of a substantially amorphous alloy to a heat treatment in an atmosphere containing a reactive gas under the conditions of temperature and time falling within the amorphous region in the isothermal transformation curve (TTT curve) of the alloy. The heat treatment is carried out, for instance, in an atmosphere containing oxygen and/or nitrogen at a concentration of not less than 1 ppm or in the air at a temperature of not less than the lowest temperature required for the oxidation or nitriding reaction of at least one component element of the matrix material. By this heat treatment, it is possible to produce a ceramic hard layer on the surface of the article in such a manner that the content of oxide and/or nitride gradually decreases in the depth direction.

8 Claims, 6 Drawing Sheets

FORMED ARTICLE OF AMORPHOUS ALLOY HAVING HARDENED SURFACE AND METHOD FOR PRODUCTION THEREOF

BACKGROUND OF THE INVENTION

1. Field of the Invention

This invention relates to a formed article of an amorphous alloy having a hardened surface and a method for the production thereof. More particularly, this invention relates to a surface hardening technique for forming a ceramic hard layer on the surface of a part or article, particularly component parts of an optical connector such as capillary, ferrule, sleeve, and V-grooved substrate and component parts of a golf club head such as face, crown, and sole.

2. Description of the Prior Art

A formed article made of a metallic material has an advantage that it requires no machining or easy machining in contrast with a formed article made of a ceramic material. Among other metallic materials, an amorphous alloy (metallic glass) has such advantages that it permits faithful reproduction of the shape and size of a cavity of a metal mold by the metal mold casting from melt thereof or by the molding process utilizing the viscous flow of the material resorting to the glass transition region thereof and allows manufacture of a formed article with high accuracy at a low cost, without requiring further machining. Furthermore, since the amorphous alloy is excellent in mechanical strength and chemical properties, it is applied to various parts and articles. For instance, Japanese Patent Application, KOKAI (Early Publication) No. (hereinafter referred to briefly as "JP-A-") 10-186176 and JP-A-10-311923 disclose components parts of an optical connector made of an amorphous alloy, such as ferrule, capillary, and sleeve, and JP-A-11-104281 discloses a golf club head in which at least a face part is made of an amorphous alloy.

SUMMARY OF THE INVENTION

Such articles as an optical connector which is prone to frequent attachment and detachment of the counter connector and a golf club head which is prone to frequent collision against another object (a golf ball or other objects) inevitably require to possess high resistance to abrasion. Heretofore, however, no example of subjecting the article made of an amorphous alloy to any specific coating or surface hardening is known in the art. This is because that the amorphous alloy is considered to possess higher strength and higher hardness as compared with a general-purpose metal and further that it is difficult to effect the hardening treatment thereof by the normal surface hardening process. When the amorphous alloy is subjected to an abrasion test using the counter material of ceramics, however, there is the possibility of producing an abrasive powder due to the difference in hardness because the amorphous alloy has the hardness of about 500 Hv, while the ceramics have the hardness of about 1200 Hv. It is therefore desired to further improve the abrasion resistance of the component parts of the optical connector which is predominantly manufactured from the ceramic material such as zirconia and which is prone to frequent attachment and detachment of the counter connector and a golf club head which is prone to frequent collision against pebblestones or the like upon making a shot.

As a surface hardening method, the method of coating a hard film of TiC, TiN, etc. on the surface of a substrate by the sputtering process or by the ion plating process is commonly known in the art. However, such methods pose a problem of the separation of the hard film due to the difference in the coefficient of thermal expansion between the base material and the hard film, depending on the film thickness. Further, such methods require the expensive apparatus such as the sputtering device or the ion plating device. Moreover, they require a further treatment such as the coating of an intermediate film to obviate the difference in the thermal expansion coefficient. However, this treatment cannot be applied to an amorphous alloy because the higher temperature of treatment causes the crystallization of the amorphous alloy.

On the other hand, the surface of the optical connector is hardened by an ion exchange treatment as effected in the article of crystallized glass. This method also has the similar problem as mentioned above that an apparatus for the ion exchange treatment is expensive.

A steel material is commonly subjected to carburizing, nitriding, flame hardening or the like to harden the surface thereof. Such surface hardening treatments require a special expensive apparatus. Furthermore, such methods cannot be applied to an amorphous alloy because the treating temperature is so high as to cause the crystallization of the amorphous alloy.

It is, therefore, a fundamental object of the present invention to provide a formed article of an amorphous alloy having significantly improved resistance to abrasion besides the excellent properties naturally possessed by the amorphous alloy and a surface hardening technique therefor.

A further particular object of the present invention is to provide a treating method which allows hardening of the surface part only of a formed article at a lower cost as compared with a conventional surface hardening process, without changing the amorphous structure of the matrix material and the size of the article.

To accomplish the object mentioned above, according to the present invention, there is provided a method for the production of a formed article of an amorphous alloy having a hardened surface, which method comprises subjecting a formed article of a substantially amorphous alloy containing an amorphous phase in a volumetric ratio of at least 50% to a heat treatment in an atmosphere containing a reactive gas under the conditions of temperature and time falling within the amorphous region in the isothermal transformation curve (TTT curve) of the material, thereby forming a ceramic hard layer on the surface of the article.

Preferably the formed article mentioned above is made of an amorphous alloy possessing a glass transition region, particularly a glass transition region of a temperature width of not less than 30 K.

In a more concrete preferred embodiment, the heat treatment mentioned above is carried out in an atmosphere containing oxygen and/or nitrogen at a concentration of not less than 1 ppm or in the air and at a temperature of not less than the lowest temperature required for the oxidation or nitriding reaction of at least one component element of the matrix material. More preferably, the heat treatment mentioned above is carried out under the conditions falling within the range enclosed by the following four points; (1) treating temperature of 350° C.—treating time of 10 minutes, (2) treating temperature of 350° C.—treating time of 120 minutes, (3) treating temperature of 420° C.—treating time of 120 minutes, and (4) treating temperature of 450° C.—treating time of 10 minutes.

By carrying out the above heat treatment, it is possible to produce a hard layer containing an oxide and/or nitride of at least one component element of the matrix material in such a manner that the content of oxide and/or nitride gradually decreases in the depth direction from the surface toward the inside of the matrix material, with an amount of change in the surface roughness or size of not more than 10 μm.

The present invention further provides a formed article of an amorphous alloy subjected to the aforementioned surface hardening treatment, characterized by having a ceramic hard layer containing a ceramic component formed by the transformation of at least one component element of the matrix material into ceramic in the surface of the formed article of a substantially amorphous alloy containing an amorphous phase in a volumetric ratio of at least 50%.

In a more concrete preferred embodiment, the ceramic hard layer mentioned above contains a ceramic component comprising an oxide and/or nitride of at least one component element of the matrix material and has such a gradient structure that the content of ceramic component is continuously or stepwise increased in the direction toward the surface.

The formed articles of an amorphous alloy as mentioned above may be useful as parts or articles in various fields. Since the formed articles of an amorphous alloy have excellent resistance to abrasion besides good mechanical strength and chemical properties, they are befit for component parts of an optical connector such as capillaries, ferrules, sleeves, and V-grooved substrates and component parts of a golf club head such as faces, crowns, and soles.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

Figure 1:
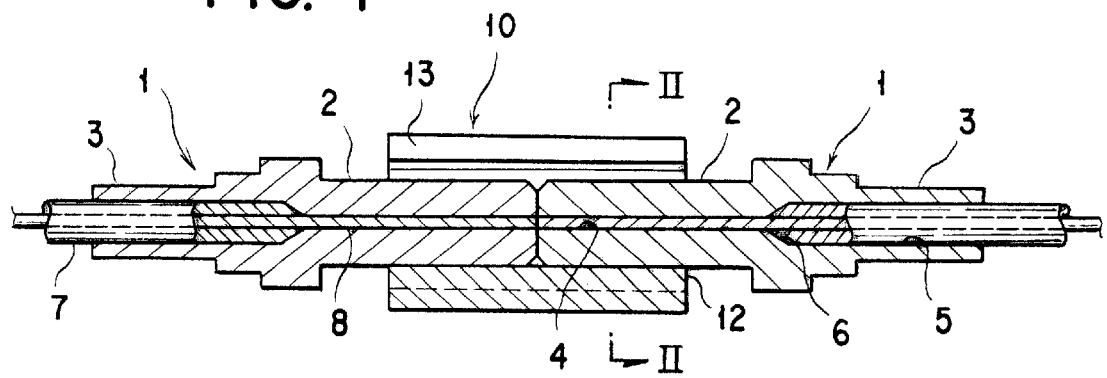
FIG. 1 is a fragmentary cross-sectional view schematically illustrating an embodiment of an optical connector ferrule and a sleeve to which the present invention is applied.

In accordance with the method of the present invention, a ceramic hard layer is produced on the surface of a formed article by subjecting the formed article of an amorphous alloy to a heat treatment in an atmosphere containing a reactive gas under the conditions of temperature and time falling within the amorphous region in the isothermal transformation curve (TTT curve) of the material, as mentioned above. Since this method is basically a heat treatment, it is possible to produce a ceramic hard layer integrally and strongly bonded to the surface of the matrix material at a low cost by using a simple apparatus. Furthermore, it is possible to produce a uniform ceramic hard layer on a fixed article to be treated because the method is a heat treatment. Accordingly, there is no need to rotate the object to be coated as employed in the conventional coating method of a hard layer. As a result, it is possible to use a simple treating apparatus with no complicated structure. Generally, the coating of a hard film poses a significant problem of separation of the film. According to the method of the present invention, a ceramic hard layer is formed by the transformation of at least one component element of the matrix material into ceramic, for example an oxide or nitride is formed by oxidation or nitriding reaction thereof, and the resultant ceramic hard layer has such gradient structure that the production ratio of these ceramic particles, i.e. their content in the matrix material is high in the surface part contacting with the treating atmosphere and gradually decreases in the depth direction. Therefore, the hard layer is integrally and strongly bonded to the matrix material and poses no problem of separation as in the case of a coating film. Further, it will scarcely undergo a change in the surface roughness or size. Particularly, since the oxidation treatment can be carried out in the air, this treatment is an economical hardening process because it does not require the use of an expensive vacuum apparatus. Besides, the treating operation is easy as compared with the conventional oxidation treatment or nitriding treatment of steel.

As a reactive gas used in the surface hardening treatment of the formed article of amorphous alloy according to the present invention, oxygen, air, nitrogen, ammonia, etc. may be used. Oxygen or nitrogen may be used in the form of an atmosphere containing this gas at a concentration capable of causing oxidation or nitriding of the component element, usually an atmosphere of an inactive gas such as argon or vacuum containing oxygen or nitrogen at a concentration of not less than 1 ppm, respectively. $H_2$ may be added to the atmosphere in order to accelerate the reaction. When the air is used as a reactive gas, the surface of the formed article of amorphous alloy can be easily oxidized by heat treating it in the air. The conditions of the heat treatment are required to be those exceeding the temperature and duration sufficient to cause the oxidation or nitriding reaction of at least one component element of the matrix material but not the crystallization of the matrix material itself, that is to say, within the amorphous region in the isothermal transformation curve (TTT curve) of the material. The thickness (depth) and the degree of gradient of the structure of the ceramic hard layer formed on the surface of the article varies with the change of temperature and duration of the heat treatment. By changing a concentration (partial pressure) of the reactive gas, it is also possible to form the ceramic hard layer having such a gradient structure that the content of ceramic component is continuously or stepwise increased in the direction toward the surface. Even if such a ceramic hard layer is formed, the surface roughness or size will hardly change. As will be clear from the working examples mentioned hereinafter, the amount of change in the surface roughness or size is not more than 10 μm.

Although the formed article to which the present invention is applied does not need to be limited to any particular article but may be any of the formed articles made of a substantially amorphous alloy containing an amorphous phase in a volumetric ratio of at least 50%, the amorphous alloy having a composition represented by either one of the following general formulas (1) to (6) can be advantageously used.

$$M^1_a M^2_b Ln_c M^3_d M^4_e M^5_f \tag{1}$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (misch metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$.

The above amorphous alloy includes those represented by the following general formulas (1-a) to (1-p).

$$M^1_a M^2_b \tag{1-a}$$

This amorphous alloy has large negative enthalpy of mixing and good producibility of the amorphous structure due to the coexistence of the $M^2$ element and Zr or Hf.

$$M^1_a M^2_b Ln_c \tag{1-b}$$

The addition of a rare earth element to the alloy represented by the above general formula (1-a), as in this amorphous alloy, enhances the thermal stability of the amorphous structure.

$$M^1_a M^2_b M^3_d \tag{1-c}$$

$$M^1_a M^2_b Ln_c M^3_d \tag{1-d}$$

The filling of gaps in the amorphous structure with the $M^3$ element having a small atomic radius (Be, B, C, N, or O), as in these amorphous alloys, makes the structure stable and enhances the producibility of the amorphous structure.

$$M^1_a M^2_b M^4_e \tag{1-e}$$

$$M^1_a M^2_b Ln_c M^4_e \tag{1-f}$$

$$M^1_a M^2_b M^3_d M^4_e \tag{1-g}$$

$$M^1_a M^2_b Ln_c M^3_d M^4_e \tag{1-h}$$

The addition of a high melting metal, $M^4$ (Ta, W, or Mo) to the above alloys, as in these amorphous alloys, enhances the heat resistance and corrosion resistance without affecting the producibility of the amorphous structure.

$$M^1_a M^2_b M^5_f \tag{1-i}$$

$$M^1_a M^2_b Ln_c M^5_f \tag{1-j}$$

$$M^1_a M^2_b M^3_d M^5_f \tag{1-k}$$

$$M^1_a M^2_b Ln_c M^3_d M^5_f \tag{1-l}$$

$$M^1_a M^2_b M^4_e M^5_f \tag{1-m}$$

$$M^1_a M^2_b Ln_c M^4_e M^5_f \tag{1-n}$$

$$M^1_a M^2_b M^3_d M^4_e M^5_f \tag{1-o}$$

$$M^1_a M^2_b Ln_c M^3_d M^4_e M^5 \tag{1-p}$$

These amorphous alloys containing a noble metal, $M^5$ (Au, Pt, Pd, or Ag) will not be brittle even if the crystallization occurs.

$$Al_{100-g-h-i} Ln_g M^6_h M^3_i \tag{2}$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, and $0 \leq i \leq 10$.

The above amorphous alloy includes those represented by the following general formulas (2-a) and (2-b).

$$Al_{100-g-h} Ln_g M^6_h \tag{2-a}$$

This amorphous alloy has large negative enthalpy of mixing and good producibility of the amorphous structure.

$$Al_{100-g-h-i} Ln_g M^6_h M^3_i \tag{2-b}$$

This amorphous alloy has a stable structure and enhanced producibility of the amorphous structure due to the filling of gaps in the amorphous structure with the $M^3$ element having a small atomic radius (Be, B, C, N, or O).

$$Mg_{100-p} M^7_p \tag{3}$$

wherein $M^7$ represents at least one element selected from the group consisting of Cu, Ni, Sn, and Zn; and p represents an atomic percentage falling in the range of $5 \leq p \leq 60$.

This amorphous alloy has large negative enthalpy of mixing and good producibility of the amorphous structure.

$$Mg_{100-q-r} M^7_q M^8_r \tag{4}$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$.

The filling of gaps in the amorphous structure of the alloy of the above general formula (3) with the $M^8$ element having a small atomic radius (Al, Si, or Ca), as in this amorphous alloy, makes the structure stable and enhances the producibility of the amorphous structure.

$$Mg_{100-q-s} M^7_q M^9_s \tag{5}$$

$$Mg_{100-q-r-s} M^7_q M^8_r M^9_s \tag{6}$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

The addition of a rare earth element to the alloy of the general formula (3) or (4) mentioned above, as in these amorphous alloys, enhances the thermal stability of the amorphous structure.

Among other amorphous alloys mentioned above, the Zr-TM-Al and Hf-TM-Al (TM: transition metal) amorphous alloys having very wide differences between the glass transition temperature (Tg) and the crystallization temperature (Tx) exhibit high strength and high corrosion resistance, possess wide supercooled liquid ranges (glass transition ranges), ΔTx=Tx−Tg, of not less than 30 K, and extremely wide supercooled liquid ranges of not less than 60 K in the case of the Zr-TM-Al amorphous alloys. In the above temperature ranges, these amorphous alloys manifest very satisfactory workability owing to viscous flow even at such low stress not more than some tens MPa. They are characterized by being produced easily and very stably as evinced by the fact that they are enabled to furnish an amorphous bulk material even by a casting method using a cooling rate of the order of some tens K/sec. By the metal mold casting from melt and by the molding process utilizing the viscous flow resorting to the glass transition range as well, these alloys produce amorphous materials and permit very faithful reproduction of the shape and size of a molding cavity of a metal mold.

The Zr-TM-Al and Hf-TM-Al amorphous alloys to be used in the present invention possess very large range of ΔTx, though variable with the composition of alloy and the method of determination. The $Zr_{60}Al_{15}Co_{2.5}Ni_{7.5}Cu_{15}$ alloy (Tg: 652K, Tx: 768K), for example, has such an extremely wide Δ Tx as 116 K. It also offers very satisfactory resistance to oxidation such that it is hardly oxidized even when it is heated in the air up to the high temperature of Tg. The Vickers hardness (Hv) of this alloy at temperatures from room temperature through the neighborhood of Tg is up to 460 (DPN), the tensile strength thereof is up to 1,600 MPa, and the bending strength thereof is up to 3,000 MPa. The thermal expansion coefficient, α of this alloy from room temperature through the neighborhood of Tg is as small as $1 \times 10^{-5}$/K, the Young's modulus thereof is 91 GPa, and the elastic limit thereof in a compressed state exceeds 4–5%. Further, the toughness of the alloy is high such that the charpy impact value falls in the range of 60–70 $kJ/m^2$. This alloy, while exhibiting such properties of very high strength as mentioned above, has the flow stress thereof lowered to the neighborhood of 10 MPa when it is heated up to the glass transition range thereof. This alloy, therefore, is characterized by being worked very easily and being manufactured with low stress into minute parts and high-precision parts complicated in shape. Moreover, owing to the properties of the so-called glass (amorphous) substance, this alloy is characterized by allowing manufacture of formed (deformed) articles with surfaces of extremely high smoothness and having substantially no possibility of forming a step which would arise when a slip band appeared on the surface as during the deformation of a crystalline alloy.

Generally, an amorphous alloy begins to crystallize when it is heated to the glass transition range thereof and retained therein for a long time. In contrast, the aforementioned alloys which possess such a wide ΔTx range as mentioned above enjoy a stable amorphous phase and, when kept at a temperature properly selected in the ΔTx range, avoid producing any crystal for a duration up to about two hours. The user of these alloys, therefore, does not need to feel any anxiety about the occurrence of crystallization during the standard molding process.

The aforementioned alloys manifest these properties unreservedly during the course of transformation thereof from the molten state to the solid state. Generally, the manufacture of an amorphous alloy requires rapid cooling. In contrast, the aforementioned alloys allow easy production of a bulk material of a single amorphous phase from a melt by the cooling which is effected at a rate of about 10 K/sec. The solid bulk material consequently formed also has a very smooth surface. The alloys have transferability such that even a scratch of the order of microns inflicted by the polishing work on the surface of a metal mold is faithfully reproduced.

When the aforementioned alloys are adopted as the casting material, therefore, the metal mold to be used for producing the molded article is only required to have the surface thereof adjusted to fulfill the surface quality expected of the molded article because the cast product faithfully reproduces the surface quality of the metal mold. In the conventional metal mold casting method, therefore, these alloys allow the steps for adjusting the size and the surface roughness of the molded article to be omitted or diminished.

The characteristics of the aforementioned amorphous alloys including in combination relatively low hardness, high tensile strength, high bending strength, relatively low Young's modulus, high elastic limit, high impact resistance, high resistance to abrasion, smoothness of surface, and highly accurate castability or workability render these alloys appropriate for use as the material for the molded articles used in various fields such as, for example, a ferrule or a sleeve for the optical connector. Furthermore, an amorphous alloy possesses highly accurate castability and machinability as well as excellent transferability capable of faithfully reproducing the contour of the cavity of the mold. It is, therefore, possible to manufacture the molded article satisfying dimensional prescription, dimensional accuracy, and surface quality by the metal mold casting method or molding method with high mass productivity by a single process insofar as the metal mold to be used is suitably prepared.

As a material used for the production of the formed article of an amorphous alloy to which the present invention is applied, various amorphous alloys heretofore known in the art such as those disclosed in, for example, JP-A-10-186176, JP-A-10-311923, JP-A-11-104281, and JP-A-11-189855, the teachings of which are incorporated by reference, may be used besides amorphous alloys mentioned above.

Although the surface hardening process according to the present invention may be applied to any formed articles made of an amorphous alloy, it can be advantageously applied to the component parts of an optical connector such as capillaries, ferrules, sleeves, and V-grooved substrates and the component parts of a golf club head.

Figure 2:
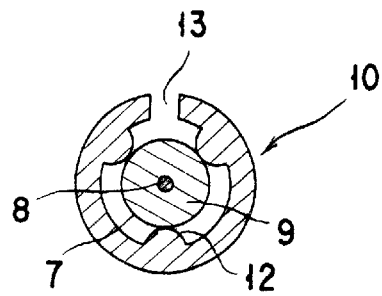
FIG. 2 is a cross-sectional view taken along the line II—II in FIG. 1.

FIG. 1 and FIG. 2 illustrate one embodiment of optical connector ferrules and a sleeve, both made of an amorphous alloy, and the mode of use thereof. Each of the ferrules 1 has a one-piece construction comprising a capillary part 2 and a flange part 3.

Specifically, this ferrule 1 is composed of the capillary part 2 which has formed along the axis thereof a through-hole 4 of a small diameter intended for the insertion of an optical fiber 8 (or the basic thread of an optical fiber coated with a plastic thin film) and the flange part 3 which has formed along the axis thereof a through-hole 5 of a large diameter intended for the insertion of a sheathed optical fiber 7 (the optical fiber coated with a sheath 9). The through-hole 4 of the small diameter and the through-hole 5 of the large diameter are connected into each other through a tapered part 6.

The sleeve 10 comprises a tubular body 11, ridges (elongate elevations) 12 having a semi-circular cross section and raised from the inner wall surface of the tubular body 11 at three points as extended from one to the other end thereof in the longitudinal direction, and a slit 13 formed in the wall of the tubular body 11 throughout the entire length in the longitudinal direction thereof.

The connection of a pair of optical fibers 8, 8 is attained by inserting into the sleeve 10 through the opposite ends thereof the ferrules 1, 1 having the optical fibers already inserted and joined therein and then abutting the end faces of the ferrules 1, 1, as shown in FIG. 1. As a result, the optical fibers 8, 8 are allowed to have their leading ends abutted and joined in a state having the axes thereof aligned to each other.

Although the sleeve 10 used in the embodiment described above has the slit 13 formed in the wall thereof throughout the entire length in the longitudinal direction, a precision sleeve which is not furnished with this slit or a precision sleeve which is further not furnished with the ridges may be employed.

Figure 3:
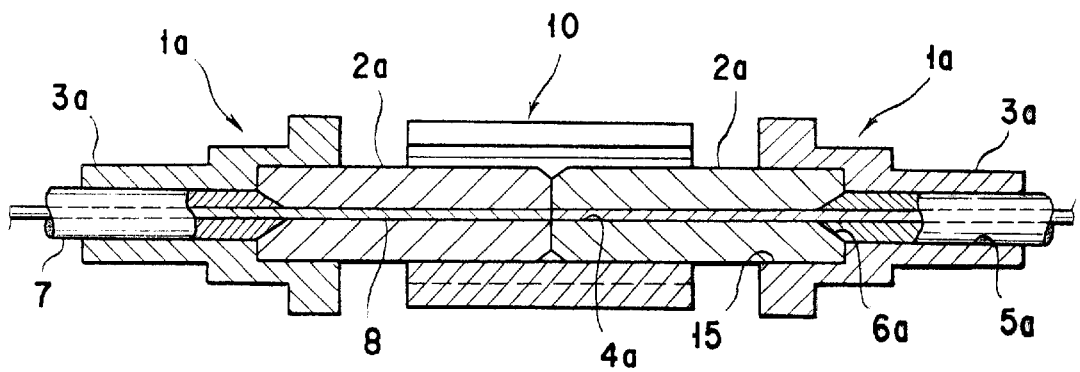
FIG. 3 is a cross-sectional view schematically illustrating another embodiment of an optical connector ferrule and a sleeve to which the present invention is applied.

FIG. 3 illustrates another embodiment of optical connector ferrules 1a and the sleeve 10, both made of an amorphous alloy, and the mode of use thereof. The ferrule 1a uses a capillary part and a flange part as separate components.

Specifically, this ferrule 1a is composed of the capillary 2a which has formed along the axis thereof a through-hole 4a of a small diameter intended for the insertion of the optical fiber 8 and the flange 3a which has formed along the axis thereof a through-hole 5a of a large diameter for the insertion of the sheathed optical fiber 7. It is assembled by fixing the end part of the capillary 2a enclosing a tapered hole 6a therein in an leading end hole part 15 of the flange 3a by virtue of tight fit or adhesion. The mode of attachment of the sleeve 10 and the ferrules 1a, 1a is the same as that of the embodiment illustrated in FIG. 1 and FIG. 2.

Figure 4:
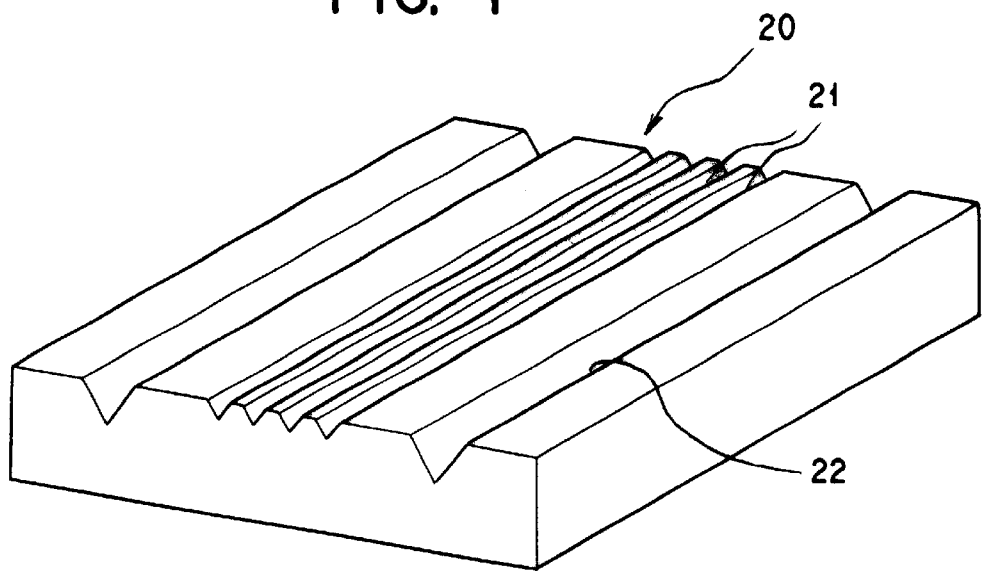
FIG. 4 is a perspective view schematically illustrating an embodiment of a V-grooved substrate used in a multifiber optical connector, to which the present invention is applied.

FIG. 4 illustrates the appearance of one embodiment of a V-grooved substrate made of an amorphous alloy, which is used in a fitting type optical connector. This V-grooved substrate 20 is provided at its upper face with four V-grooves 21 for optical fibers formed in parallel with each other and two V-grooves 22 for guide pins on both sides thereof. This V-grooved substrate 20 is suitable for use in the multifiber optical connector.

Figure 5:
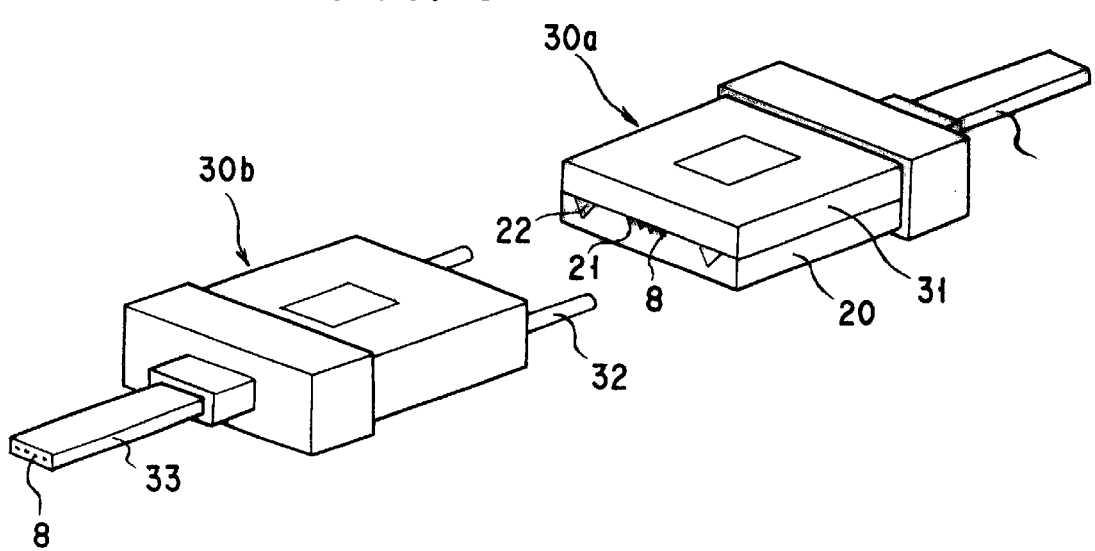
FIG. 5 is a perspective view schematically illustrating an embodiment of a multifiber optical connector using the V-grooved substrate shown in FIG. 4.
Figure 6:
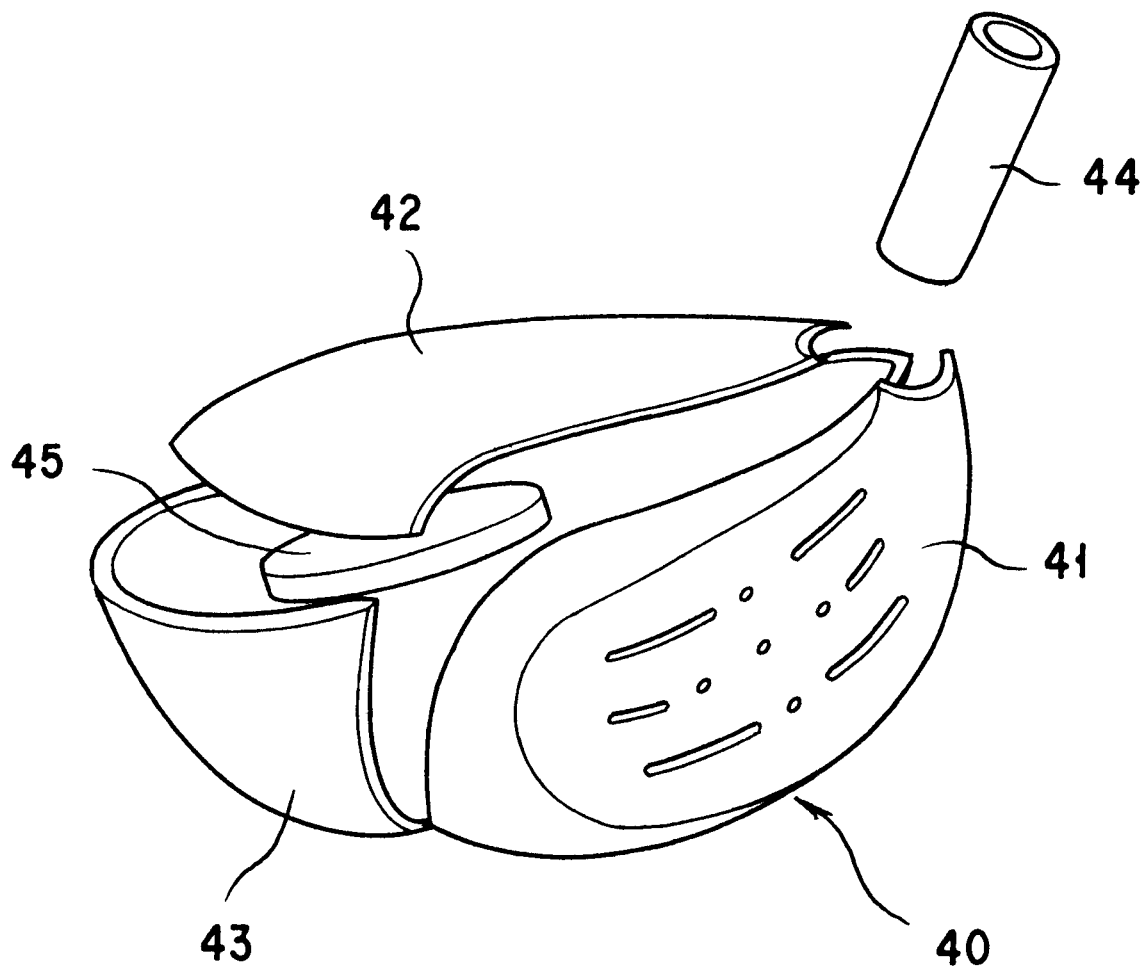
FIG. 6 is an exploded perspective view schematically illustrating an embodiment of a hollow golf club head to which the present invention is applied.

FIG. 5 illustrates a multifiber optical connector 30a (in the example shown in the drawing, four-fiber optical connector) using the V-grooved substrate 20 shown in FIG. 4. The multifiber optical connector 30a is basically composed of the V-grooved substrate 20 shown in FIG. 4 and a retaining substrate 31 fixed to the V-grooved substrate 20 through the medium of an adhesive. By joining the retaining substrate 31 to the V-grooved substrate 20, the holes for optical fibers and those for guide pins are respectively formed by the V-grooves 21 for optical fibers and the V-grooves 22 for guide pins in the joining area thereof. The multifiber optical connector is prepared by inserting and adhering the optical fibers 8 into the holes for optical fibers and polishing the end face of the assembled connector. Another multifiber optical connector 30b is similarly provided with a plurality of holes for optical fibers into which the optical fibers are inserted and adhered, but has guide pins 32 projected at the positions aligned with the V-grooves for guide pins mentioned above. The mutual coupling of the optical connectors is performed by inserting the guide pins 32 into the holes for guide pins mentioned above. The reference numeral 33 denotes a fiber tape. FIG. 6 illustrates a hollow golf club head 40 composed of a face part 41, a crown part 42, and a sole part 43 in combination. In FIG. 6, the reference numeral 44 denotes a hosel part which functions as a fixing portion for a shaft (not shown), and 45 a balance weight. These parts are integrally joined by such means as adhering, welding, squeezing, or bolting to form the head. Alternatively, the face part 41 and the hosel part 44 are integrally molded. Otherwise, the crown part 42 and the sole part 43 may be integrally casted with the face part 41 and the face component piece may be integrally joined to the resultant body.

Figure 7:
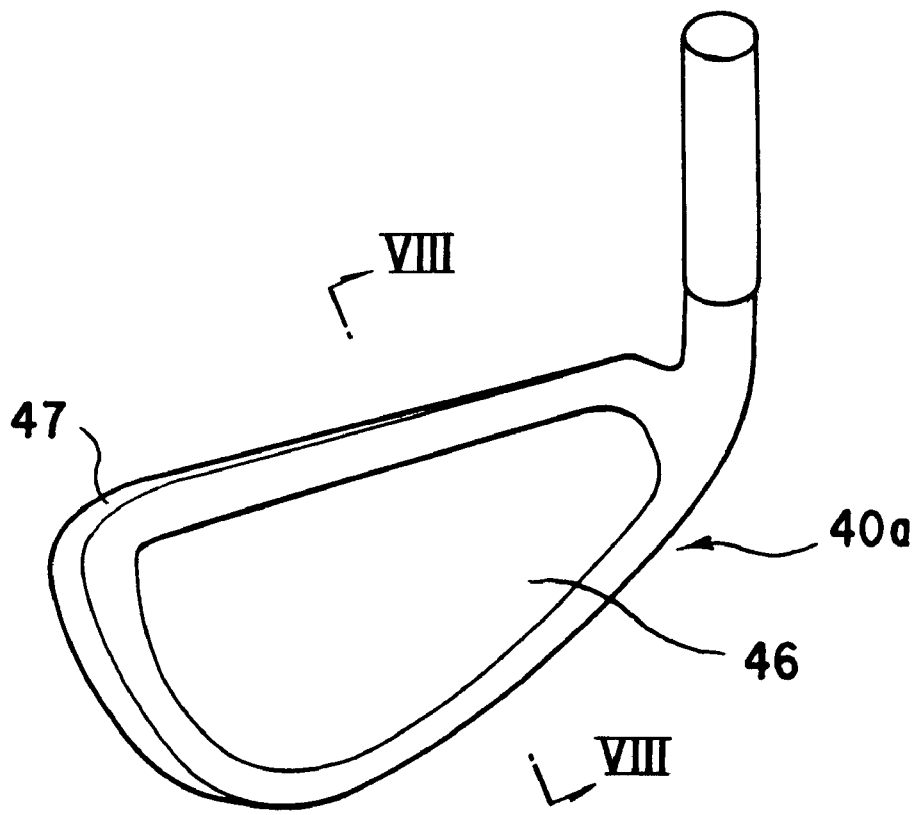
FIG. 7 is a perspective view schematically illustrating an embodiment of a golf club head of the iron type to which the present invention is applied.
Figure 8:
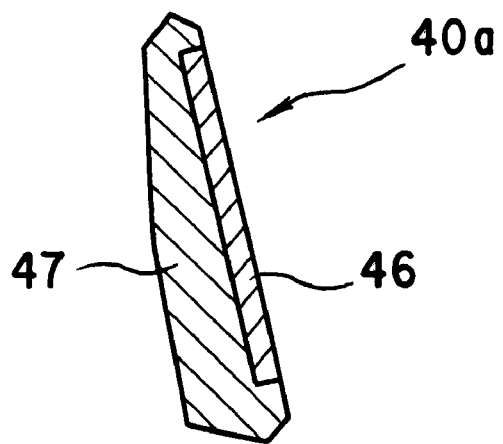
FIG. 8 is a cross-sectional view taken along the line VIII—VIII in FIG. 7.

FIG. 7 and FIG. 8 illustrate an embodiment of an iron type golf club head 40a in which a face part 46 is embedded in a solid body 47.

By manufacturing the component parts of the golf club head or at least the face part and the sole part mentioned above from an amorphous alloy to make the best use of the characteristics of this material, i.e. high strength and high hardness, but low elastic modulus, it is possible to reduce the weight thereof because the high strength allows the wall thickness to be thin. As a result, it is possible to manufacture a large-sized head to increase the moment of inertia for sending a golf ball flying to a distance with a long shaft. Furthermore, since the light head enables the weight in the peripheral portion of the head to be properly balanced, the sweet area can be enlarged, thereby maintaining the direction of the hit ball and the flying distance stably. Since the material has low elastic modulus while having high strength, good impact resilience and high striking efficiency are attained when hit the ball, thereby increasing the flying distance of the ball. Moreover, when the head is subjected to the surface hardening treatment according to the present invention, there is obtained the advantages that the resistance to abrasion and the durability thereof is significantly improved.

Now, the present invention will be described more concretely below with reference to working examples which have confirmed the effect of the present invention specifically.

Figure 9:
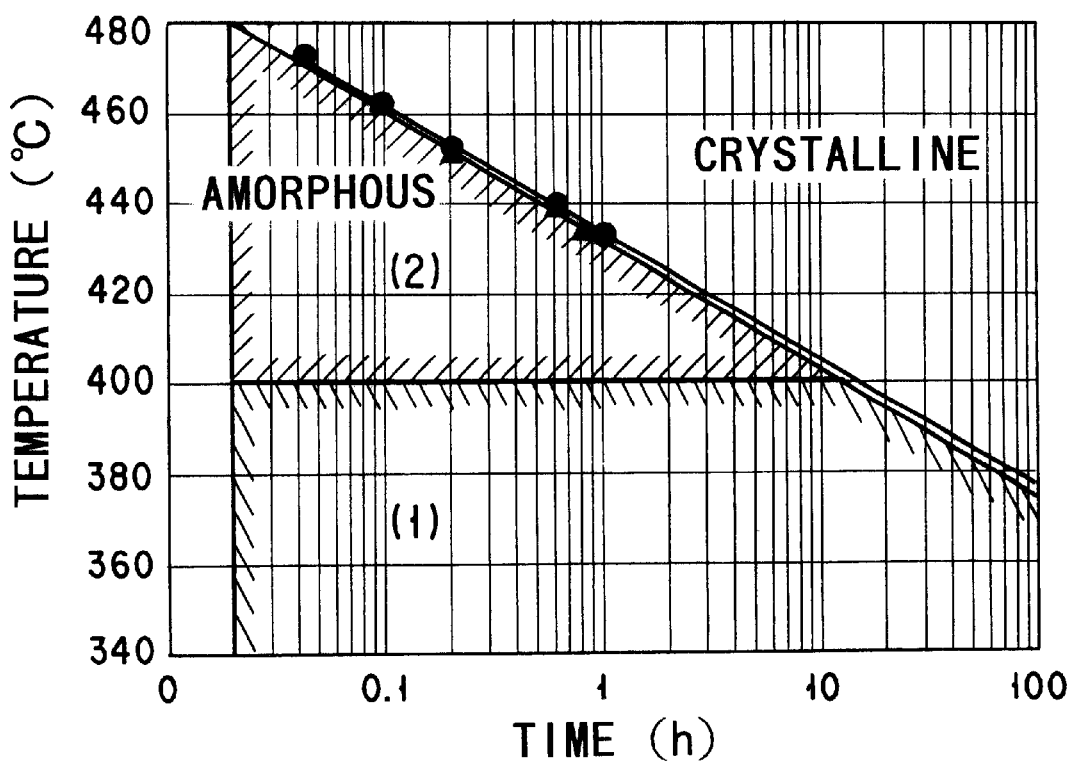
FIG. 9 is a graph showing the relation between the TTT curve of Zr-based amorphous alloy ($Zr_{55}Ni_5Al_{10}Cu_{30}$) and the conditions of a heat treatment.

FIG. 9 shows the conditions of the heat treatment according to the present invention with respect to a Zr-based amorphous alloy ($Zr_{55}Ni_5Al_{10}Cu_{30}$) as an example. Since this amorphous alloy exhibits the TTT curve as shown in FIG. 9, the surface of this amorphous alloy can be easily oxidized by the heat treatment in the air under the conditions falling in the amorphous region of (1) and (2) in FIG. 9, but at a temperature of not less than 180° C. (the lowest possible temperature for oxidation of Zr commonly known in the art) and the duration of not less than one minute. In the case of the nitriding treatment, the treatment should be carried out under the conditions falling in the region (2) in FIG. 9 because the temperature required for reaction of Zr and N is not less than 400° C.

Figure 10:
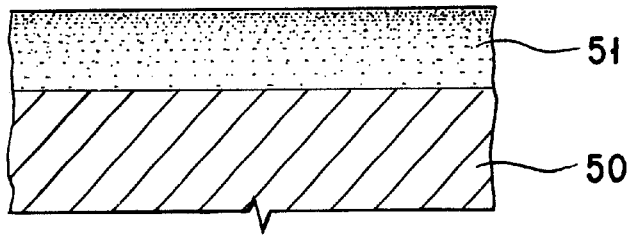
FIG. 10 is a fragmentary cross-sectional view schematically illustrating the state of surface of the Zr-based amorphous alloy which has undergone the surface hardening treatment according to the present invention.

By effecting the heat treatment under such conditions, a strongly fixed ceramic hard layer exibiting high resistance to abrasion is formed on the surface of the amorphous alloy. During this treatment, among the elements constituting the amorphous alloy, the transformation of the element whose oxide or nitride has lower free energy of formation occurs preponderantly. Accordingly, the composition of the hard layer depends on this preponderancy. In the case of the Zr-based amorphous alloy mentioned above, a ceramic hard layer 51 containing oxides mainly composed of $ZrO_2$ is formed on the surface of the amorphous alloy (matrix) 50 by the heat treatment thereof in the air, as shown in FIG. 10, and the content of oxides therein varies obliquely so that the content gradually decreases in the direction from the surface to the depths.

Figure 11:
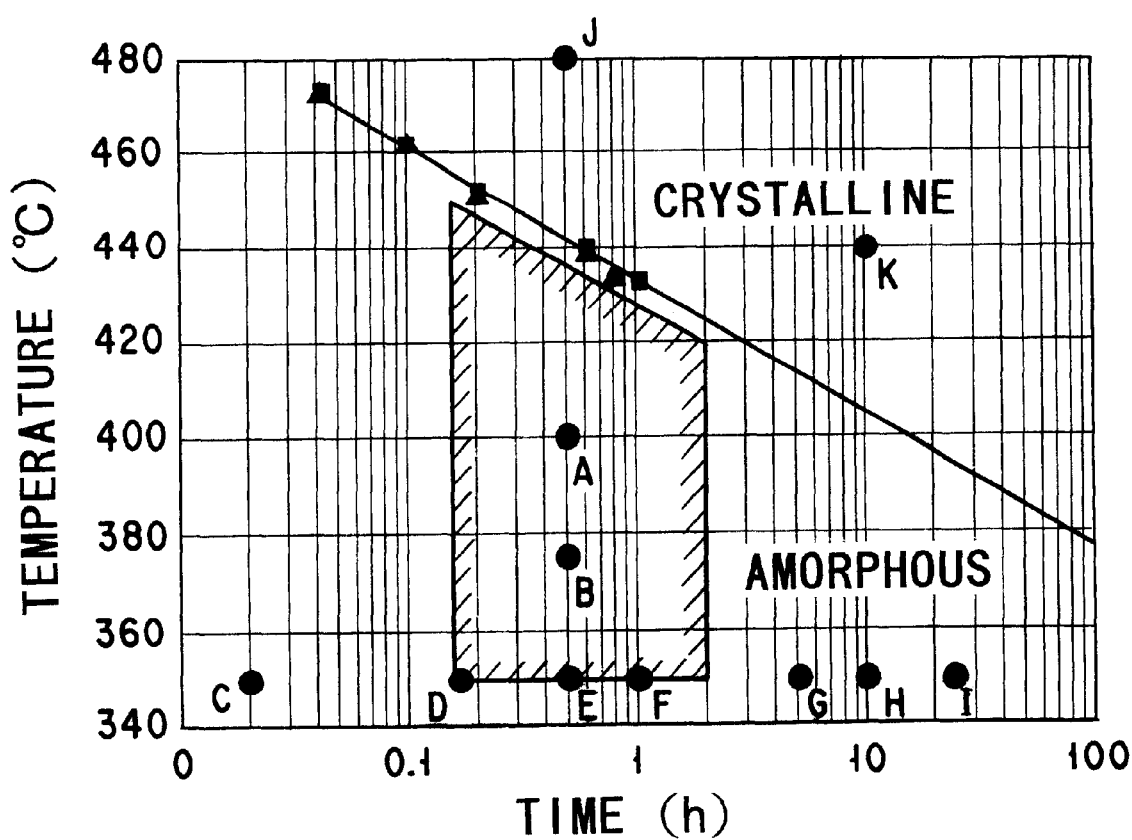
FIG. 11 is a graph showing the relation between the TTT curve of Zr-based amorphous alloy ($Zr_{55}Ni_5Al_{10}Cu_{30}$) and the preferred conditions of the heat treatment.

Next, the samples obtained by subjecting the cast samples of the Zr-based amorphous alloy mentioned above to the heat treatment in the air under various conditions of A to K shown in FIG. 11 and the comparative sample which had not undergone the heat treatment were tested for hardness (Knoop hardness), change in surface roughness, change in size and abrasion. The results are shown in Table 1. The abrasion test was carried out by rubbing the sample surface with a pin (1.6 mm in diameter) made of a sintered hard metal under the surface pressure of about 4 GPa.

TABLE 1

| Heat treatment conditions | Hardness (N/mm$^2$) | Amount of change in surface roughness ($\mu$m) | Amount of change in size ($\mu$m) | Abrasion test*) |
|---|---|---|---|---|
| A | 7159–7355 | <0.1 | <0.1 | o |
| B | 6080–6276 | <0.1 | <0.1 | o |
| C | 4904–5100 | <0.1 | <0.1 | x |
| D | 5002–5198 | <0.1 | <0.1 | o |
| E | 5590–5884 | <0.1 | <0.1 | o |
| F | 5884–6080 | <0.1 | <0.1 | o |
| G | 7355–7846 | <0.5 | <0.5 | o |
| H | 8826–9219 | <2 | <2 | o |
| I | 12259–12749 | <5 | <5 | o |
| J | 11768–12259 | >10 | >10 | o |
| K | 9807–10788 | >10 | >10 | o |
| Untreated | –4904 | — | — | x |

Remarks
*)o: No abrasion
x: Presence of abrasion

It is noted from the results of samples A, B, and E and the untreated sample shown in Table 1 that the Knoop hardness of the surface portion is increased by the heat treatment and that the Knoop hardness increases in proportion to the treating temperature, with the result of improved resistance to abrasion. Incidentally, the Knoop hardness is in proportion to the layer thickness, because the more the thickness of the hard layer is thinner, the more the penetrator indicates a softer value owing to the influence of the matrix. It is further noted from the results of samples C to I that even with the same treating temperature, the Knoop hardness increases in proportion to the treating time. However, if the heat treatment is effected for an unduly long period (samples G, H, and I), the layer thickness becomes thicker, which is effective for improving the resistance to abrasion, but rapidly deteriorates the surface roughness. Accordingly, the unduly long treatment can not be applied to the formed article which requires the surface roughness in the order of submicron. In the case of samples J and K, the amorphous alloy samples were completely crystallized after the heat treatment because the treatment was carried out under the conditions falling in the crystallization region, and the changes in size and in surface roughness were remarkable.

The preferred conditions, namely the treating temperature and treating time, for effectively performing the surface hardening of a formed article made of an amorphous alloy are in the range enclosed by hatched lines in FIG. 11, i.e. within the range enclosed by the following four points; (1) treating temperature of 350° C.—treating time of 10 minutes, (2) treating temperature of 350° C.—treating time of 120 minutes, (3) treating temperature of 420° C.—treating time of 120 minutes, and (4) treating temperature of 450° C.—treating time of 10 minutes.

While certain specific embodiments and working examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and the range of equivalency of the claims are, therefore, intended to be embraced therein.

The disclosure in Japanese Patent Application No. 11-327874 of Nov. 18, 1999 is incorporated here by reference. This Japanese Patent Application describes the invention described hereinabove and claimed in the claims appended hereinbelow and provides the basis for a claim of priority for the instant invention under 35 U.S.C. 119.

What is claimed is:

1. A method for the production of a formed article of an amorphous alloy having a hardened surface, comprising:

subjecting a formed article of a substantially amorphous alloy containing an amorphous phase in a volumetric ratio of at least 50% to a heat treatment under normal atmospheric pressure or under a vacuum pressure in an atmosphere containing a reactive gas under the conditions of temperature and time falling within an amorphous region in the isothermal transformation curve (TTT curve) of said alloy, thereby forming a ceramic hard layer on a surface of said article; and wherein said formed article is made of a substantially amorphous alloy having a composition represented by either one of the following general formulas (1) to (6):

  (1)

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (misch metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$,

  (2)

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 < h \leq 55$, and $0 \leq i \leq 10$,

  (3)

wherein $M^7$ represents at least one element selected from the group consisting of Cu, Ni, Sn, and Zn; and p represents an atomic percentage falling in the range of $5 \leq p \leq 60$,

  (4)

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s}M^7_qM^9_s \qquad (5)$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s}M^7_qM^8_rM^9_s \qquad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

2. The method according to claim 1, wherein said formed article is made of an amorphous alloy possessing a glass transition region.

3. The method according to claim 1, wherein said formed article is made of an amorphous alloy possessing a glass transition region of a temperature width of not less than 30 K.

4. The method according to claim 1, wherein said heat treatment is carried out in an atmosphere containing oxygen and/or nitrogen at a concentration of not less than 1 ppm or in the air.

5. The method according to claim 4, wherein said heat treatment is carried out at a temperature of not less than the lowest temperature required for the oxidation or nitriding reaction of at least one component element of said alloy.

6. The method according to claim 4, wherein said heat treatment is carried out to form a hard layer containing an oxide and/or nitride of at least one component element of said alloy on the surface of said article in such a manner that the content of oxide and/or nitride gradually decreases in the depth direction from the surface toward the inside of the matrix alloy.

7. The method according to claim 1, wherein said heat treatment is carried out under the conditions falling within the range enclosed by the following four points; (1) treating temperature of 350° C.—treating time of 10 minutes, (2) treating temperature of 350° C.—treating time of 120 minutes, (3) treating temperature of 420° C.—treating time of 120 minutes, and (4) treating temperature of 450° C.—treating time of 10 minutes.

8. The method according to claim 1, wherein said heat treatment is carried out to form a ceramic hard layer with an amount of change in the surface roughness and/or size of not more than 10 μm on the surface of said article.

* * * * *